(12) United States Patent
Sprowl et al.

(10) Patent No.: US 8,419,188 B2
(45) Date of Patent: Apr. 16, 2013

(54) DICHROIC WEDGE STACK LIGHT COMBINING APPARATUS, SYSTEM AND METHOD

(75) Inventors: Robert A. Sprowl, Sammamish, WA (US); Joshua M. Hudman, Sammamish, WA (US); Joshua O. Miller, Woodinville, WA (US)

(73) Assignee: Microvision, Inc., Redmond, WA (US)

( * ) Notice: Subject to any disclaimer, the term of this patent is extended or adjusted under 35 U.S.C. 154(b) by 388 days.

(21) Appl. No.: 12/755,647

(22) Filed: Apr. 7, 2010

(65) Prior Publication Data

US 2011/0249197 A1    Oct. 13, 2011

(51) Int. Cl.
| | |
|---|---|
| G03B 21/14 | (2006.01) |
| G03B 21/26 | (2006.01) |
| G03B 21/28 | (2006.01) |
| G02B 5/30 | (2006.01) |
| G02B 27/24 | (2006.01) |
| G03H 1/02 | (2006.01) |
| H04N 9/07 | (2006.01) |
| H01S 3/08 | (2006.01) |

(52) U.S. Cl.
USPC ............ 353/31; 353/84; 353/94; 353/98; 359/489.08; 359/634; 359/27; 348/339; 372/99

(58) Field of Classification Search .......... 353/31, 353/84, 94, 98; 359/489.08, 634, 27; 348/339; 372/99, 24, 15, 4
See application file for complete search history.

(56) References Cited

U.S. PATENT DOCUMENTS

| | | | | |
|---|---|---|---|---|
| 2,945,413 | A | * | 7/1960 | Kelly .......................... 359/583 |
| 3,778,548 | A | * | 12/1973 | Nistri .......................... 348/115 |
| 4,411,492 | A | * | 10/1983 | Bluege ......................... 359/572 |
| 6,407,974 | B1 | * | 6/2002 | Kim et al. ................ 369/112.29 |
| 2006/0109551 | A1 | | 5/2006 | Hutchin |
| 2007/0086495 | A1 | | 4/2007 | Sprague et al. |
| 2009/0195875 | A1 | | 8/2009 | Pasca et al. |
| 2010/0033685 | A1 | * | 2/2010 | Seo et al. ........................ 353/31 |
| 2011/0116169 | A1 | * | 5/2011 | Hudman ....................... 359/634 |
| 2011/0222024 | A1 | * | 9/2011 | Lu et al. ......................... 353/31 |

FOREIGN PATENT DOCUMENTS

| | | |
|---|---|---|
| JP | 06-007658 | 1/1994 |
| WO | WO 2009070832 A1 * | 6/2009 |

OTHER PUBLICATIONS

Microvision, Inc., , "International Search Report and Written Opinion", *ISR and Written Opinion for PCT/US2011/029411* Nov. 21, 2011.

* cited by examiner

*Primary Examiner* — Georgia Y Epps
*Assistant Examiner* — Magda Cruz
(74) *Attorney, Agent, or Firm* — Kevin D. Wills (57) ABSTRACT

A wavelength combining apparatus includes first and second optical devices. The first optical device collects and collimates or focuses light from multiple laser light sources. The second optical device includes multiple nonparallel dichroic surfaces to combine light received from the first optical device.

19 Claims, 7 Drawing Sheets

DICHROIC WEDGE STACK LIGHT COMBINING APPARATUS, SYSTEM AND METHOD

FIELD

The present invention relates generally to laser based systems, and more specifically to combining laser light of different wavelengths.

BACKGROUND

Various laser based systems produce and combine light of different wavelengths. For example, a scanning laser projector might produce light at three different wavelengths in the visible spectrum (red, green, and blue) and combine the light into a single collimated beam.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
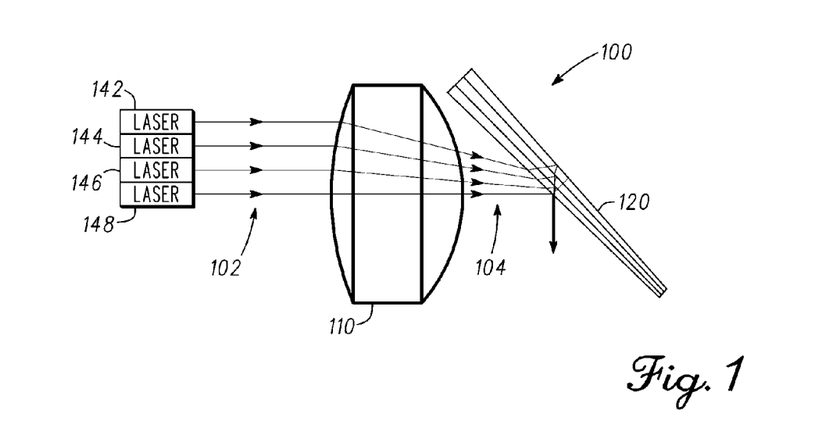
FIG. 1 shows a wavelength combining apparatus in accordance with various embodiments of the present invention.

FIG. 1 shows a wavelength combining apparatus in accordance with various embodiments of the present invention. Wavelength combining apparatus 100 includes optical elements 110 and 120. FIG. 1 also shows laser light producing devices 142, 144, 146, and 148.

Optical element 110 is shown as an aspheric lens, although this is not a limitation of the present invention. For example, optical element 110 may be a reflective element as described below with reference to FIG. 4. Optical element 120 is a device that includes multiple dichroic surfaces at angles relative to each other. Optical element 120, and variants thereof, is referred to herein as a "wedged dichroic stack" or "wedge-shaped dichroic stack".

In operation, laser light producing devices 142, 144, 146, and 148 produce beams of laser light at 102. The light beams are represented in FIG. 1 by parallel chief rays 102, although in some embodiments, chief rays 102 may not be parallel. The laser light at 102 is collected and collimated or focused by optical device 110. By action of optical device 110, the laser light emerging from device 110 are offset in angle but overlap in position at or near the focal plane of the lens (device 110). The laser light leaving optical device 110 is represented by nonparallel chief rays 104. Wedged dichroic stack 120 receives the light beams represented by rays 104 and converts the angle of each beam so that the beams enter with different angles but emerge at a substantially common angle. As a result, the beams from multiple lasers can be aligned in angle and position creating a "white" beam. The term "white" is used herein to refer to any combination of at least two light beams having different wavelengths. The beam emitted from wedged dichroic stack 120 is a substantially collimated light beam that includes light originating from each of the plurality of light sources. The term "substantially collimated" refers to the multiple different wavelength light beams substantially overlapping and at a substantially common angle.

As shown in FIG. 1, laser light producing device 148 is positioned such that the laser emission point of the device is aligned with the optical axis of device 110, and the chief ray from device 148 travels substantially along the optical axis. In various embodiments of the present invention, at least one laser light producing device is positioned so that its laser emission point is offset from the optical axis. As shown in FIG. 1, laser light producing devices 142, 144, and 146 are all positioned such that their laser emission points are offset on the same side of the optical axis, although this is not a limitation of the present invention. As described below with reference to later figures, some embodiments include laser devices positioned such that their laser emission points are offset on both sides of the optical axis. Further, FIG. 1 shows all laser light producing devices at substantially the same distance from optical device 110. Some embodiments include laser light devices at various distances from optical device 110.

Any type or combination of types of laser light producing devices may be utilized for devices 142, 144, 146, and 148. For example, in some embodiments laser diodes may be used. Laser diodes tend to have a very small form factor and may be positioned very close. Also for example, in some embodiments, larger laser light producing devices may be employed. Fiber optics or waveguides may be used to direct light to optical device 110.

The laser light may be at any wavelength. For example, laser devices 142, 144, and 146 may be in the visible spectrum (e.g., red, green, blue) and laser device 148 may be in the nonvisible spectrum (e.g., infrared). Further, FIG. 1 shows four laser light sources at different wavelengths, although this is not a limitation of the present invention. For example, some embodiments include fewer or more than four laser light sources. In addition, in some embodiments, only visible wavelength laser light sources are included, and in other embodiments, only nonvisible wavelength laser light sources are included.

Figure 2:
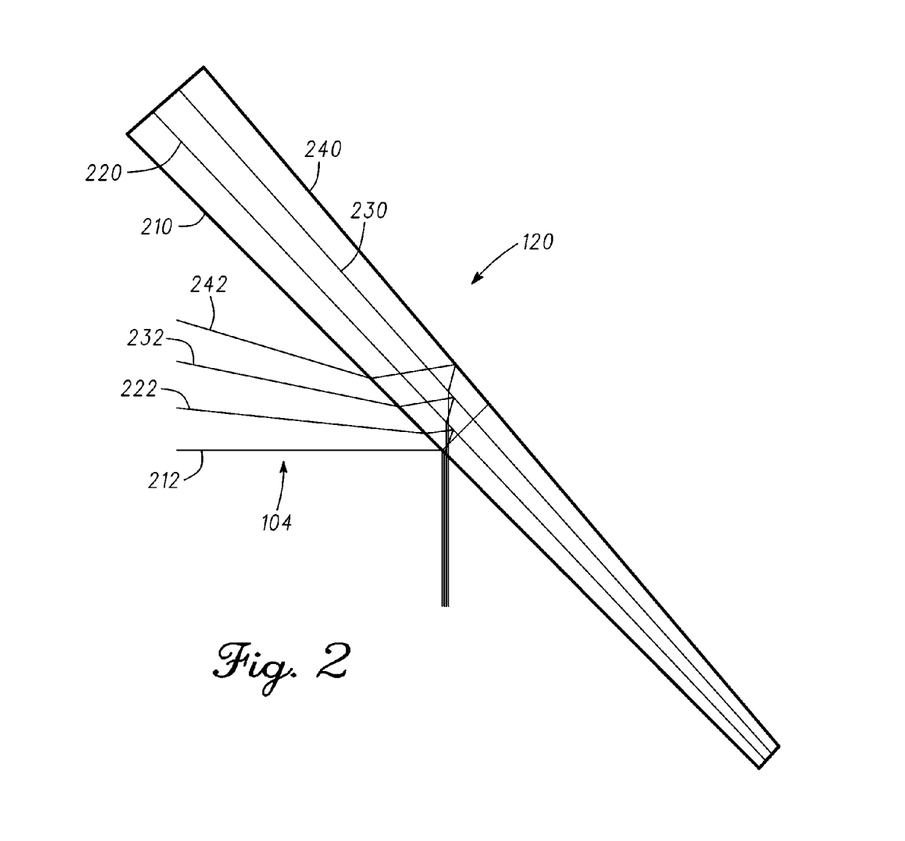
FIG. 2 shows a wedged dichroic stack in accordance with various embodiments of the present invention.

FIG. 2 shows a wedged dichroic stack in accordance with various embodiments of the present invention. Wedged dichroic stack 120 is the same as optical element 120 shown in FIG. 1. Wedged dichroic stack 120 includes four nonparallel surfaces 210, 220, 230, and 240, at least three of which have dichroic properties. As used herein, the term "dichroic" refers to the optical properties of a device that reflects light over a certain range of wavelengths, and transmits light which is outside that range. Further, the terms "dichroic surface," "dichroic filter," "dichroic plate," and the like, refer to surfaces, filters, plates, and the like, that exhibit dichroic properties.

For example, dichroic surface 210 reflects light at the wavelength of light 212 and passes light at the wavelengths of light 222, 232, and 242. Similarly, dichroic surface 220 reflects the light at the wavelength of light 222 and passes light at the wavelengths of light 232 and 242. Further, dichroic surface 230 reflects the light at the wavelength of light 232 and passes light at the wavelength of light 242. Surface 240 may have dichroic properties or may be fully reflective.

In general, wedged dichroic stack 120 includes n−1 wedged dichroic plates, where n is the number of beams to be combined. Each interface between plates forms a dichroic surface that is at an angle relative to the next so that beams that are offset in angle and position entering the stack leave the stack substantially aligned in position and angle. The stack can also be used in reverse so that a white beam enters the stack and exits separated into its component wavelength bands. The width of the stack can be the same order as the size of the beam and the thickness can be made as small as is practical for fabrication.

The dichroic stack has low angular sensitivity so that as the stack is rotated the angular beam separation is much lower than the rotation angle. The stack of dichroic wedges can also have low wavelength sensitivity if the coatings are designed to accept a wide wavelength band. As the stack is moved in and out of the position of the beam crossing, the beams can be made to separate or overlap in position while keeping the angle fixed. The thickness can also be varied for each plate to either reduce beam separation or to make beams perfectly overlap.

In some embodiments, the wedges may be separated with an air gap and tilted to compensate for angle. The air gap may be varied to compensate for displacement without affecting angle. Parallel plates may be used for the same effect.

In some embodiments, the nonparallel surfaces of wedged dichroic stack 120 may be formed by applying optical coatings on wedge shaped substrates and then forming a stack from the individual wedges. Optical coatings that impart dichroic properties are generally well known. In other embodiments, nonparallel surfaces with dichroic properties are formed using other methods. Wedged dichroic stacks may be manufactured using any method without departing from the scope of the present invention.

Figure 3:
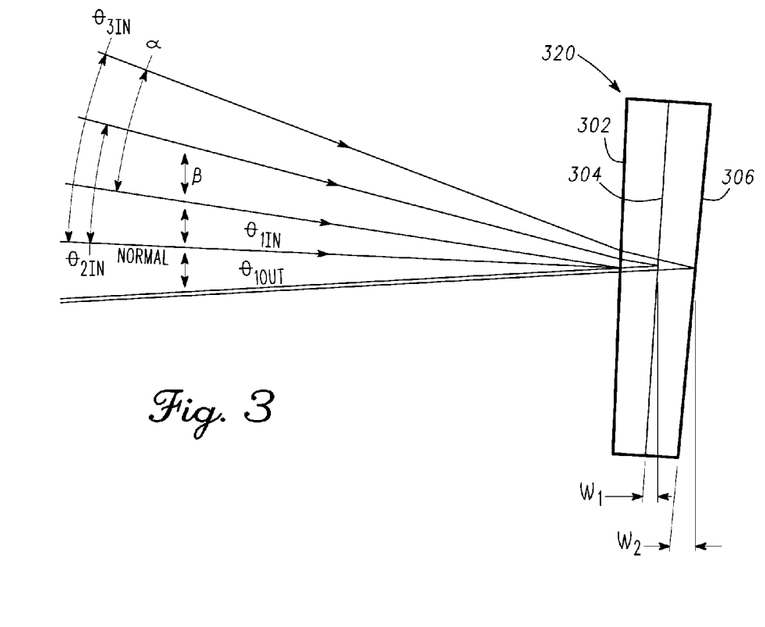
FIG. 3 shows incident light angles and wedge angles in a wedged dichroic stack.

FIG. 3 shows incident light angles and wedge angles in a wedged dichroic stack. Wedged dichroic stack 320 includes three nonparallel surfaces, at least two of which have dichroic properties. For example, surfaces 302 and 304 have dichroic properties, and surface 360 may have dichroic properties or may be fully reflective. As shown in FIG. 3, surfaces 302 and 304 have an angular offset of $\omega_1$, and surfaces 302 and 306 have an angular offset of $\omega_2$.

Wedged dichroic stack 320 may be designed to have any angles $\omega_1$ and $\omega_2$ depending on expected incident angles of incoming light beams. The angles of the wedges in combination with the refractive index of the substrate affect the relationships between the incoming light beam angles and the exit angles. In some embodiments, each substrate wedge has the same refractive index n. In these embodiments, each light beam only sees one reflective surface because of the dichroic properties of the surfaces within wedged dichroic stack 320.

As shown in FIG. 3, and assuming the small angle approximation $\sin(\theta) \approx \theta$ applies, then $$\theta_{1out} = \theta_{1in} \tag{1}$$

$$\theta_{2out} = n*(\theta_{2in}/n + 2\omega_1) \tag{2}$$

$$\theta_{3out} = n*(\theta_{3in}/n + 2\omega_2), \tag{3}$$

where $\theta_{1in}$, $\theta_{2in}$, and $\theta_{3in}$ are the incoming light beam angles, $\theta_{1out}$, $\theta_{2out}$, and $\theta_{3out}$ are the exit angles, n is the index of the substrate, and $\omega_1$ and $\omega_2$ are the first and second wedge angles.

Substituting $\theta_{2in} = \theta_{1in} + \beta$ and $\theta_{3in} = \theta_{1in} + \alpha$ where $\beta = \theta_{2in} - \theta_{1in}$ and $\alpha = \theta_{3in} - \theta_{1in}$, and solving for $\omega_1$ and $\omega_2$ so that $\theta_{1out} = \theta_{2out} = \theta_{3out}$ gives $$\omega_1 = \beta/2n, \; \omega_2 = \alpha/2n. \tag{4}$$

This is but one example of how to determine wedge angles based on other criteria in the system. Wedge angles may be determined using any method and criteria without departing from the scope of the present invention. For example, in some embodiments, individual wedged dichroic plates may have different refractive indices n, and in some embodiments, the small angle approximation $\sin(\theta) \approx \theta$ may not be employed.

Figure 4:
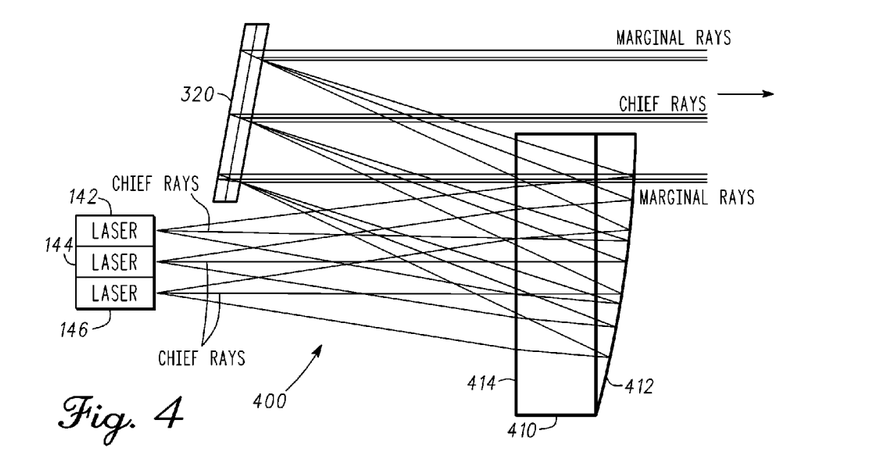
FIG. 4 shows a reflective wavelength combining apparatus in accordance with various embodiments of the present invention.

FIG. 4 shows a reflective wavelength combining apparatus in accordance with various embodiments of the present invention. Wavelength combining apparatus 400 includes optical device 410 and optical device 320. FIG. 4 also shows laser light producing devices 142, 144, and 146. Previous figures only showed chief rays from each laser device for simplicity. FIG. 4 shows both chief rays and marginal rays. The marginal rays are shown diverging from the chief rays as they exit the laser devices, and the collimating or focusing operation of optical device 410 is shown as the chief rays and marginal rays leave device 410.

Optical device 410 is shown as an off-axis aspheric mirror 412 coupled to a transmissive portion 414. Some embodiments omit the transmissive portion 414, and only include a reflective portion (mirror 412). The function of optical device 410 is similar to that of optical device 110 (FIG. 1) except that it is reflective. Three laser devices are shown, but this is not a limitation of the present invention. Any number of laser devices may be included, and they may operate at any combination of wavelengths.

Figure 5:
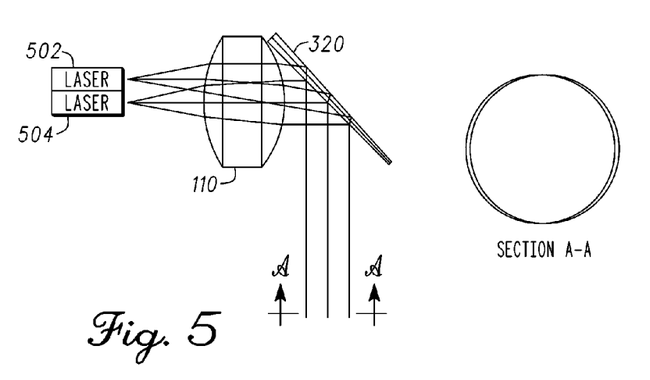
FIGS. 5 and 6 show effects of tilting laser light sources in various embodiments of wavelength combining apparatus.
Figure 6:
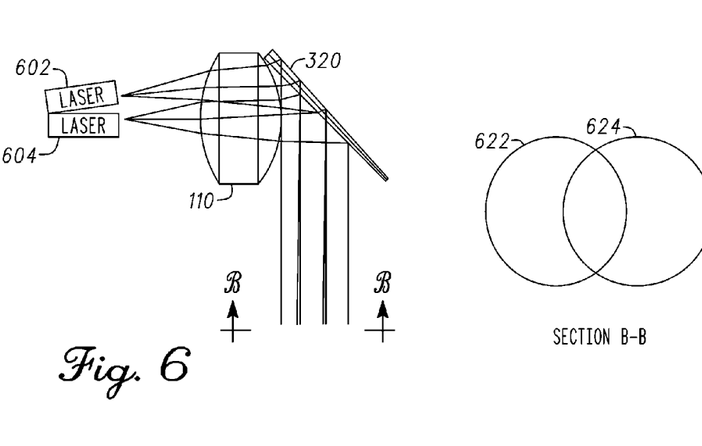

FIGS. 5 and 6 show effects of tilting laser light sources in various embodiments of wavelength combining apparatus. Light sources can be tilted relative to the optical axis. This can be used to find the best geometry or as a compensator to separate beams or bring them together without changing the angle of the output beam. For example the laser could be tilted to compensate for an error in the wedges.

FIG. 5 shows laser light producing devices 502 and 504 positioned such that their chief rays are substantially parallel to the optical axis of optical device 110. Optical device 110 collects and collimates or focuses the laser light and provides it to optical device 320 at an angle. As described above, wedged dichroic stack 320 receives the light at angles and provides the light output in a single collimated white beam. The cross section of the resultant beam is shown in section A-A of FIG. 5.

FIG. 6 shows laser light producing devices 602 and 604 positioned such that the chief light rays provided by the two laser devices are not parallel. Section B-B of FIG. 6 shows the effect of the tilted positioning of laser light producing device 602 where beam footprint 624 corresponds to light generated by laser device 604 and beam footprint 622 corresponds to light generated by laser device 602. In some embodiments, this is used to advantage for alignment. For example, one or more laser light producing devices may have a modifiable position that allows adjustment of beam locations.

After adjustments, the various laser light producing devices may or may not produce parallel rays of light. Further, the various laser light producing devices may or may not be aligned on the same side of the optical axis of optical device 110.

Figure 7:
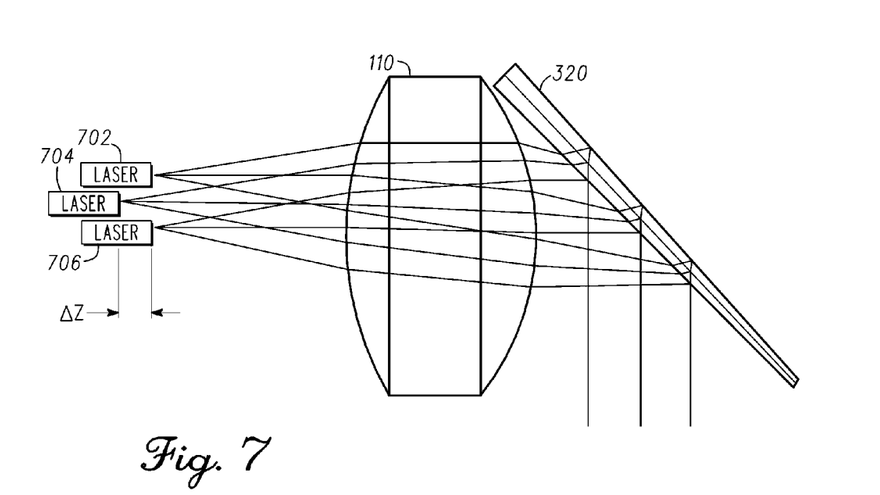
FIG. 7 shows a wavelength combining apparatus with laser light sources at various distances from a collection lens.

FIG. 7 shows a wavelength combining apparatus with laser light sources at various distances from a collection lens. As shown in FIG. 7, laser light producing devices 702, 704, and 706 are not all the same distance from optical device 110. In the example of FIG. 7, laser device is Δz further away than the other laser devices. In some embodiments, light sources are offset as shown in FIG. 7 so that the different colors focus in the same z plane or a different z plane. The ability to focus different colors separately may obviate a need for an achromatic lens.

Figure 8:
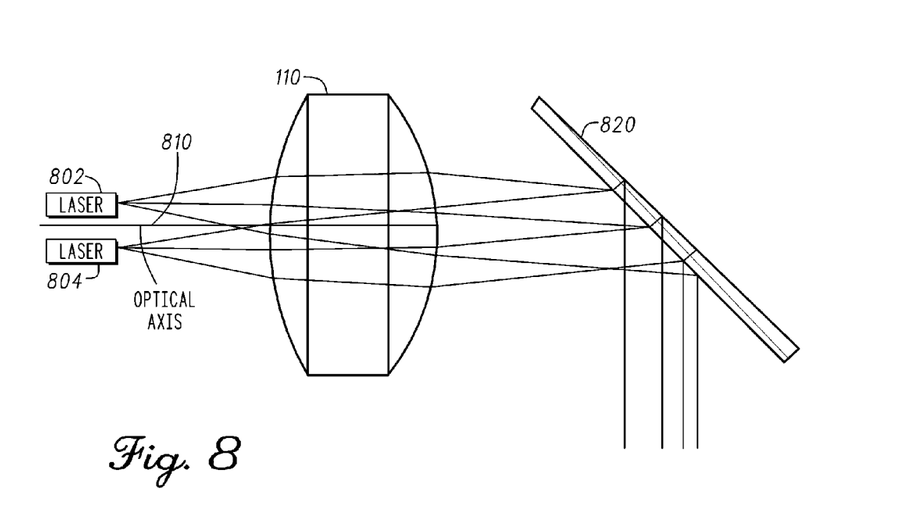
FIG. 8 shows a wavelength combining apparatus with laser light sources on two sides of an optical axis of a collection lens.

FIG. 8 shows a wavelength combining apparatus with laser light sources on two sides of an optical axis of a collection lens. Laser light sources 802 and 804 are shown on opposite sides of optical axis 810. In some embodiments, a laser light source is also aligned with the optical axis.

Figure 9:
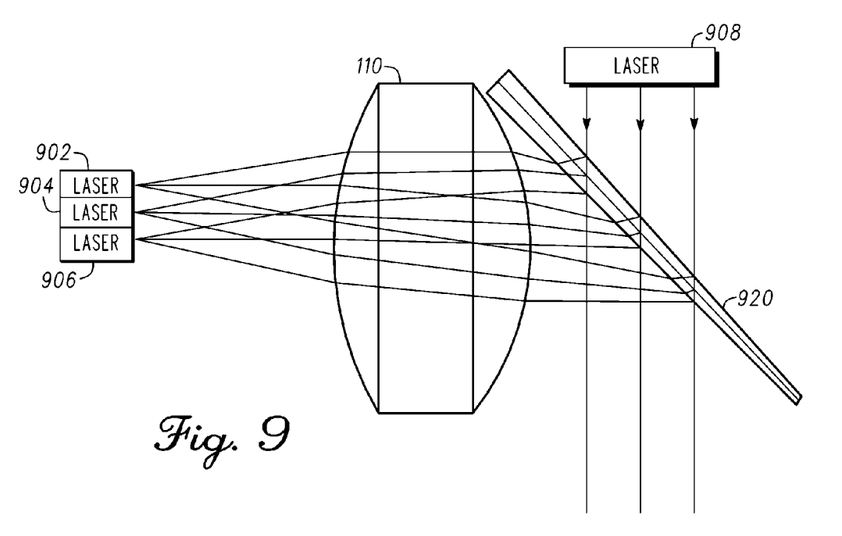
FIG. 9 shows a wavelength combining apparatus in which some laser light reaches a first side of a wedged dichroic stack from a collection optic and some laser light reaches a second side of the wedged dichroic stack.

FIG. 9 shows a wavelength combining apparatus in which some laser light reaches a first side of a wedged dichroic stack from a collection optic and some laser light reaches a second side of the wedged dichroic stack.

Laser devices 902, 904, and 906 emit light that is collected by optical device 110 as described above. Further, the light from optical device 110 is incident on a first side of wedged dichroic stack 920 as described above. Laser device 908 emits light that is incident on a second side of wedged dichroic stack 920. Light from laser device 908 may be transmitted through the wedged dichroic stack based on dichroic properties of the various nonparallel surfaces within the stack.

Although laser device 908 is shown as a single component, this is not a limitation of the present invention. For example, laser device 908 may include optical components such as a lens, a wedged dichroic stack, or the like. Further, any number of wavelengths of light may be emitted by laser device 908.

Figure 10:
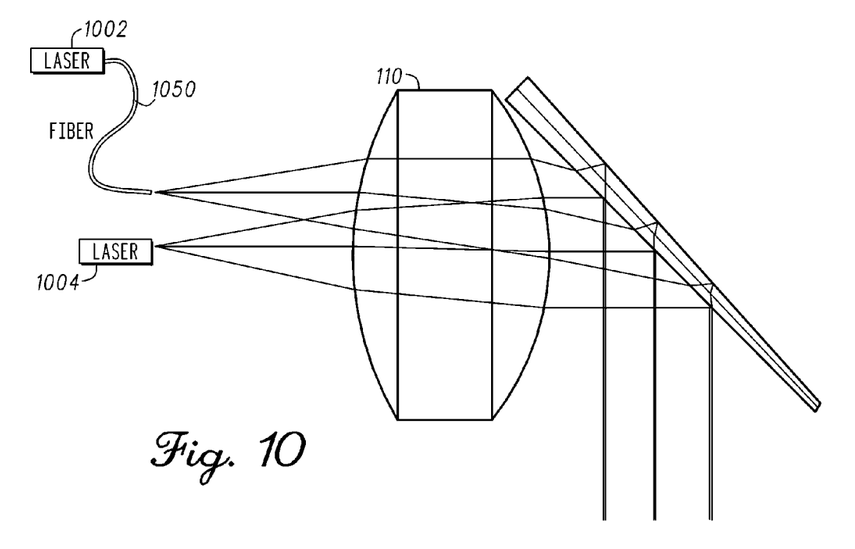
FIG. 10 shows a wavelength combining apparatus that includes fiber optics.

FIG. 10 shows a wavelength combining apparatus that includes fiber optics. Fiber 1050 provides a light path from laser device 1002 to optical device 110, while laser device 1004 is positioned as in previous figures. In some embodiments, more than one laser device is coupled to a fiber to allow the laser device to be remotely located. For example, in some embodiments, different types of laser light producing components are utilized, some of which are located near optical component 110, and some of which are remotely located and coupled to the wavelength combining apparatus using fibers.

Figure 11:
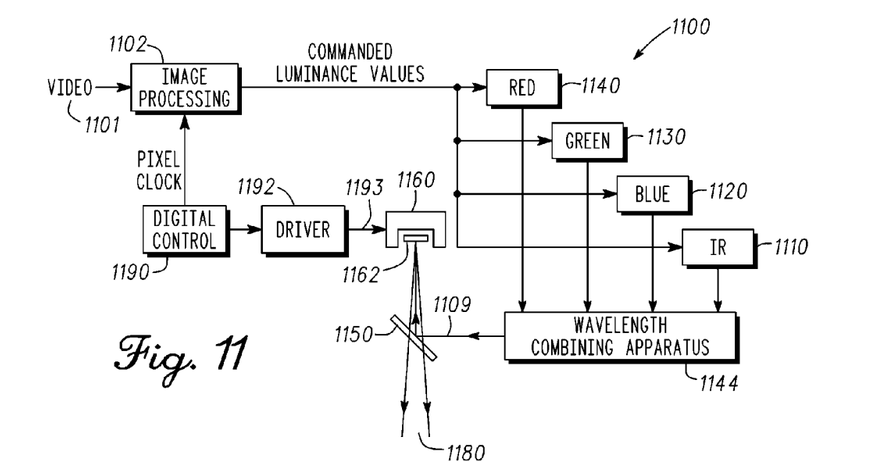
FIG. 11 shows a color laser projector.

FIG. 11 shows a color laser projection apparatus. System 1100 includes image processing component 1102, laser light sources 1110, 1120, 1130, and 1140, and wavelength combining apparatus 1144. Projection system 1100 also includes fold mirror 1150, micro-electronic machine (MEMS) device 1160 having mirror 1162, MEMS driver 1192, and digital control component 1190.

In operation, image processing component 1102 receives video data on node 1101, receives a pixel clock from digital control component 1190, and produces commanded drive values to drive the laser light sources when pixels are to be displayed. Image processing component 1102 may include any suitable hardware and/or software components useful to produce commanded drive values from video data. For example, image processing component 1102 may include application specific integrated circuits (ASICs), one or more processors, or the like.

Laser light sources 1110, 1120, 1130, and 1140 receive commanded drive values and produce light. Laser light sources 1110, 1120, 1130, and 1140 may by any type of laser light producing device. For example, in some embodiments, the laser light sources may include laser diodes. Each light source produces a narrow beam of light which is directed to wavelength combining apparatus 1144. Wavelength combining apparatus 1144 may be any of the wavelength combining apparatus described herein, including those represented in the previous figures.

The combined laser light produced by wavelength combining apparatus 1144 at 1109 is reflected off mirror 1150 on its way to MEMS mirror 1162. The MEMS mirror rotates on two axes in response to electrical stimuli received on node 1193 from MEMS driver 1192. After reflecting off MEMS mirror 1162, the laser light bypasses mirror 1150 to sweep a raster pattern and create an image at 1180.

The MEMS based projector is described as an example application, and the various embodiments of the invention are not so limited. For example, the wavelength combining apparatus described herein may be used with other optical systems without departing from the scope of the present invention.

Figure 12:
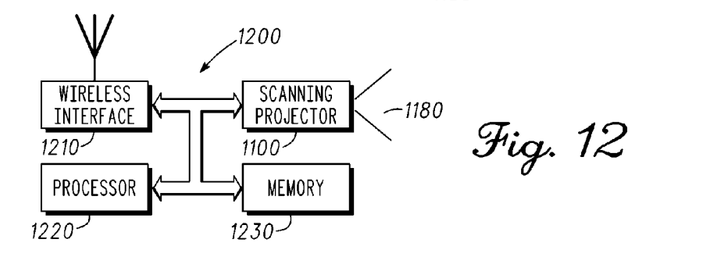
FIG. 12 shows a block diagram of a mobile device in accordance with various embodiments of the present invention.

FIG. 12 shows a block diagram of a mobile device in accordance with various embodiments of the present invention. As shown in FIG. 12, mobile device 1200 includes wireless interface 1210, processor 1220, memory 1230, and scanning projector 1100. Scanning projector 1100 paints a raster image at 1180. Scanning projector 1100 is described with reference to FIG. 11. In some embodiments, scanning projector 1100 includes a wavelength combining apparatus such as those shown in, and described with reference to, earlier figures.

Scanning projector 1100 may receive image data from any image source. For example, in some embodiments, scanning projector 1100 includes memory that holds still images. In other embodiments, scanning projector 1100 includes memory that includes video images. In still further embodiments, scanning projector 1100 displays imagery received from external sources such as connectors, wireless interface 1210, or the like.

Wireless interface 1210 may include any wireless transmission and/or reception capabilities. For example, in some embodiments, wireless interface 1210 includes a network interface card (NIC) capable of communicating over a wireless network. Also for example, in some embodiments, wireless interface 1210 may include cellular telephone capabilities. In still further embodiments, wireless interface 1210 may include a global positioning system (GPS) receiver. One skilled in the art will understand that wireless interface 1210 may include any type of wireless communications capability without departing from the scope of the present invention.

Processor 1220 may be any type of processor capable of communicating with the various components in mobile device 1200. For example, processor 1220 may be an embedded processor available from application specific integrated circuit (ASIC) vendors, or may be a commercially available microprocessor. In some embodiments, processor 1220 provides image or video data to scanning projector 1100. The image or video data may be retrieved from wireless interface 1210 or may be derived from data retrieved from wireless interface 1210. For example, through processor 1220, scanning projector 1100 may display images or video received directly from wireless interface 1210. Also for example, processor 1220 may provide overlays to add to images and/or video received from wireless interface 1210, or may alter stored imagery based on data received from wireless interface 1210 (e.g., modifying a map display in GPS embodiments in which wireless interface 1210 provides location coordinates).

Figure 13:
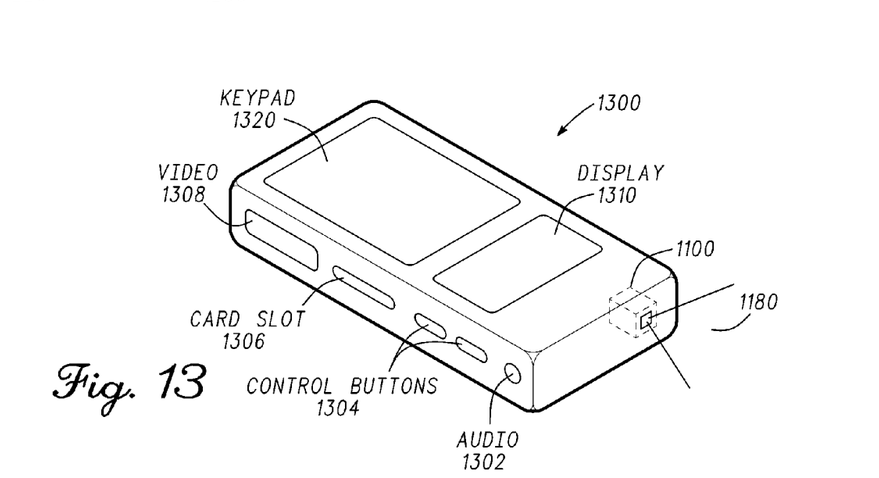
FIG. 13 shows a mobile device in accordance with various embodiments of the present invention.

FIG. 13 shows a mobile device in accordance with various embodiments of the present invention. Mobile device 1300 may be a hand held projection device with or without communications ability. For example, in some embodiments, mobile device 1300 may be a handheld projector with little or no other capabilities. Also for example, in some embodiments, mobile device 1300 may be a device usable for communications, including for example, a cellular phone, a smart phone, a personal digital assistant (PDA), a global positioning system (GPS) receiver, or the like. Further, mobile device 1300 may be connected to a larger network via a wireless (e.g., WiMax) or cellular connection, or this device can accept data messages or video content via an unregulated spectrum (e.g., WiFi) connection.

Mobile device 1300 includes scanning projector 1100 to create an image with light at 1180. Mobile device 1300 also includes many other types of circuitry; however, they are intentionally omitted from FIG. 13 for clarity.

Mobile device 1300 includes display 1310, keypad 1320, audio port 1302, control buttons 1304, card slot 1306, and audio/video (A/V) port 1308. None of these elements are essential. For example, mobile device 1300 may only include scanning projector 1100 without any of display 1310, keypad 1320, audio port 1302, control buttons 1304, card slot 1306, or A/V port 1308. Some embodiments include a subset of these elements. For example, an accessory projector product may include scanning projector 1100, control buttons 1304 and A/V port 1308.

Display 1310 may be any type of display. For example, in some embodiments, display 1310 includes a liquid crystal display (LCD) screen. Display 1310 may always display the same content projected at 1180 or different content. For example, an accessory projector product may always display the same content, whereas a mobile phone embodiment may project one type of content at 1180 while display different content on display 1310. Keypad 1320 may be a phone keypad or any other type of keypad.

A/V port 1308 accepts and/or transmits video and/or audio signals. For example, A/V port 1308 may be a digital port that accepts a cable suitable to carry digital audio and video data. Further, A/V port 1308 may include RCA jacks to accept composite inputs. Still further, A/V port 1308 may include a VGA connector to accept analog video signals. In some embodiments, mobile device 1300 may be tethered to an external signal source through A/V port 1308, and mobile device 1300 may project content accepted through A/V port 1308. In other embodiments, mobile device 1300 may be an originator of content, and A/V port 1308 is used to transmit content to a different device.

Audio port 1302 provides audio signals. For example, in some embodiments, mobile device 1300 is a media player that can store and play audio and video. In these embodiments, the video may be projected at 1180 and the audio may be output at audio port 1302. In other embodiments, mobile device 1300 may be an accessory projector that receives audio and video at A/V port 1308. In these embodiments, mobile device 1300 may project the video content at 1180, and output the audio content at audio port 1302.

Mobile device 1300 also includes card slot 1306. In some embodiments, a memory card inserted in card slot 1306 may provide a source for audio to be output at audio port 1302 and/or video data to be projected at 1180. Card slot 1306 may receive any type of solid state memory device, including for example, Multimedia Memory Cards (MMCs), Memory Stick DUOS, secure digital (SD) memory cards, and Smart Media cards. The foregoing list is meant to be exemplary, and not exhaustive.

Figure 14:
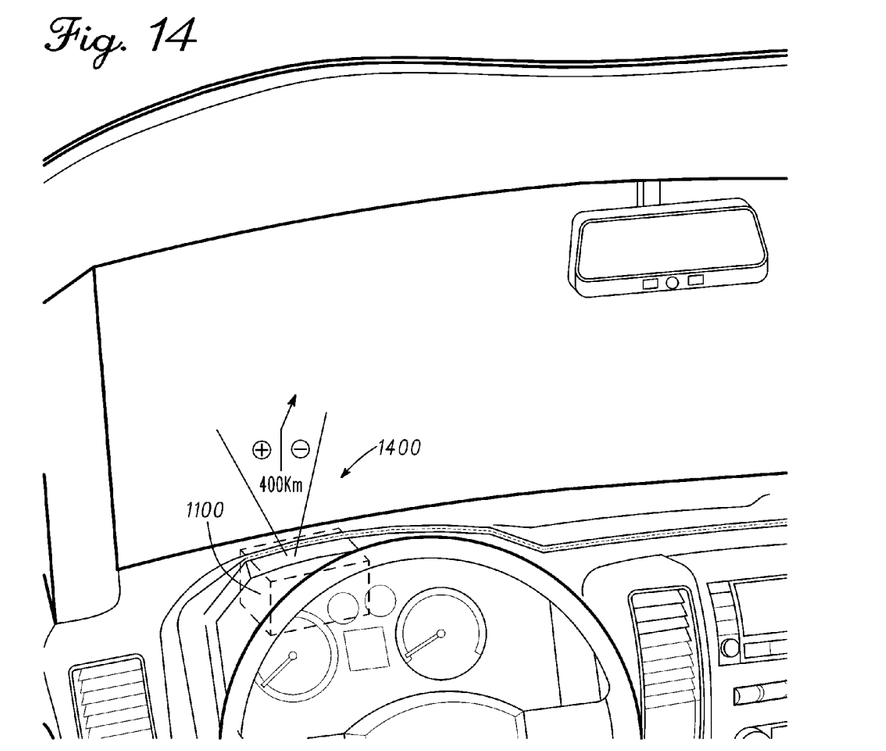
FIG. 14 shows a head-up display system in accordance with various embodiments of the invention.

FIG. 14 shows a head-up display system in accordance with various embodiments of the invention. Projector 1100 is shown mounted in a vehicle dash to project the head-up display at 1400. Although an automotive head-up display is shown in FIG. 14, this is not a limitation of the present invention. For example, various embodiments of the invention include head-up displays in avionics application, air traffic control applications, and other applications.

Figure 15:
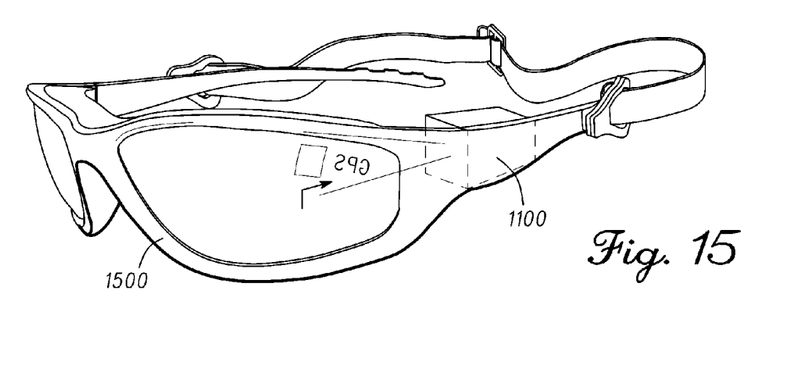
FIG. 15 shows eyewear in accordance with various embodiments of the invention.

FIG. 15 shows eyewear in accordance with various embodiments of the invention. Eyewear 1500 includes projector 1100 to project a display in the eyewear's field of view. In some embodiments, eyewear 1500 is see-through and in other embodiments, eyewear 1500 is opaque. For example, eyewear may be used in an augmented reality application in which a wearer can see the display from projector 1100 overlaid on the physical world. Also for example, eyewear may be used in a virtual reality application, in which a wearer's entire view is generated by projector 1100. Although only one projector 1100 is shown in FIG. 15, this is not a limitation of the present invention. For example, in some embodiments, eyewear 1500 includes two projectors; one for each eye.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. An apparatus comprising:
   multiple light sources;
   a first optical device to collect light from the multiple light sources and produce different color light beams having angular offsets relative to each other, wherein the first optical device has an optical axis and the multiple light sources are positioned to provide chief rays of light on one side of the optical axis; and
   a second optical device with multiple nonparallel dichroic surfaces to receive the different color light beams having angular offsets and to emit different color light beams at a substantially common angle.

2. The apparatus of claim 1 wherein the first optical device comprises a lens.

3. The apparatus of claim 1 wherein the first optical device comprises a mirror.

4. The apparatus of claim 1 wherein the multiple light sources comprise laser light sources.

5. The apparatus of claim 4 wherein at least one of the laser light sources comprises a laser diode.

6. The apparatus of claim 1 wherein the second optical device comprises a stack of wedge shaped dichroic filters.

7. An apparatus comprising:
    a plurality of laser light sources;
    an optical device positioned to receive light from each of the plurality of laser light sources; and
    a stack of wedge shaped dichroic filters positioned to receive light from the optical device and to produce light rays at a substantially common angle.

8. The apparatus of claim 7 wherein the plurality of laser light sources are positioned to provide parallel chief rays of light to the optical device.

9. The apparatus of claim 7 wherein the plurality of laser light sources are positioned to provide nonparallel chief rays of light to the optical device.

10. The apparatus of claim 7 wherein the plurality of laser light sources includes at least one laser light source that emits light in the visible spectrum.

11. The apparatus of claim 7 wherein the plurality of laser light sources includes at least one laser light source that emits light in the nonvisible spectrum.

12. The apparatus of claim 7 wherein the plurality of laser light sources includes sources of red, green, blue, and infrared light.

13. The apparatus of claim 7 wherein the optical device has an optical axis and the plurality of laser light sources are positioned to provide chief rays of light on one side of the optical axis.

14. The apparatus of claim 7 wherein the optical device has an optical axis and the plurality of laser light sources are positioned to provide chief rays of light on two sides of the optical axis.

15. The apparatus of claim 7 wherein the plurality of laser light sources are positioned at varying distances from the optical device.

16. A projection device comprising:
    a plurality of laser light sources;
    a collection optic to collect light from the plurality of laser light sources;
    an optical device having a plurality of nonparallel dichroic surfaces to receive light from the collection optic and to provide a substantially collimated light beam that includes light originating from each of the plurality of laser light sources; and
    a MEMS mirror to reflect the substantially collimated light beam in a raster pattern.

17. The projection device of claim 16 further comprising a wireless interface.

18. The projection device of claim 16 further comprising video path components to receive video data and to drive the plurality of laser light sources.

19. The projection device of claim 18 further comprising a wireless interface capable of sourcing video content to the video path components.

* * * * *